United States Patent [19]

Tsaur

[11] Patent Number: 4,954,558

[45] Date of Patent: Sep. 4, 1990

[54] RESIN-FORTIFIED EMULSION POLYMERS AND METHODS OF PREPARING THE SAME

[75] Inventor: Sheng-Liang Tsaur, Racine County, Wis.

[73] Assignee: S. C. Johnson & Son, Inc., Racine, Wis.

[21] Appl. No.: 296,248

[22] Filed: Jan. 11, 1989

Related U.S. Application Data

[60] Division of Ser. No. 205,536, Jun. 9, 1988, Pat. No. 4,820,762, which is a continuation of Ser. No. 899,281, Aug. 22, 1986, abandoned.

[51] Int. Cl.$^5$ ................................................. C08F 2/16
[52] U.S. Cl. ..................................... 525/460; 524/556
[58] Field of Search ................................. 524/460, 556

[56] References Cited

U.S. PATENT DOCUMENTS 3,666,704 5/1972 Keppler ............................... 524/460
4,539,361 9/1985 Siol et al. ............................ 524/460

FOREIGN PATENT DOCUMENTS 0814528 6/1969 Canada ................................ 524/460

Primary Examiner—Joseph L. Schofer
Assistant Examiner—Peter D. Mulcahy

[57] ABSTRACT

The stability and physical properties of high molecular weight emulsion polymers are improved by the addition of a low molecular weight support resin during the emulsion polymerization process. The resin is soluble or dispersible in water or alkali and has a number average molecular weight between 500 and 20,000.

2 Claims, No Drawings

RESIN-FORTIFIED EMULSION POLYMERS AND METHODS OF PREPARING THE SAME

REFERENCE TO RELATED APPLICATIONS

This application is a divisional application of patent application Ser. No. 205,536 filed June 9, 1988, now U.S. Pat. No. 4,820,762, which in turn is a continuation of application Ser. No. 899,281 filed Aug. 22, 1986 (now abandoned), the benefit of which is now claimed for purposes of priority pursuant to 35 U.S.C. § 120.

BACKGROUND OF THE INVENTION

The present invention relates to resin-fortified emulsion polymer compositions having improved mechanical and physical properties. Additionally, the present invention relates to methods of preparing these resin-fortified emulsion polymers.

High molecular weight emulsion polymers are gaining wide acceptance in the coatings industry. However, high molecular weight emulsion polymer technology has many drawbacks. Problems associated with high molecular weight emulsion polymer systems include poor wetting of metal substrates, cratering of resulting films, low gloss or mudcaking of resulting films, wetting and adherency problems, mechanical instability. freeze-thaw instability, shear thinning and poor physical properties of the resulting film. It is quite evident that a need exists to improve emulsion polymer systems.

U.S. Pat. No. 4,151,143, issued to Blank et al., discloses a surfactant-free polymer emulsion coating composition and a method for preparing the same. Blank et al. identify that the main problem with emulsion polymers employed for coatings is the presence of surfactants which are employed to stabilize the emulsions but which adversely affect the water and corrosion resistance of the resulting film as well as the adhesion of the coating especially to metal surfaces. The Blank et al. emulsion polymers are prepared in a two stage process. The process includes (1) a first stage wherein a conventional carboxyl group containing polymer is prepared by a conventional solution or bulk polymerization technique and thereafter water-dispersed or solubilized by partial or full neutralization thereof with an organic amine or base and application of high shear agitation and (2) a second stage wherein a mixture of polymerizable monomers and polymerization catalyst is added to the first stage emulsion at an elevated temperature to effect polymerization of the stage two monomers resulting in the formation of an emulsion coating composition. The coating composition is surfactant-free.

U.S. Pat. No. 4,179,417, issued to Sunada et al., discloses a composition for water based paints containing a water soluble resin and a water dispersible polymer. The water soluble resin contains 50–99.5 percent by weight of an alpha, beta-monoethylenically unsaturated acid alkyl ester or an alkenyl benzene, 0.5–20 percent by weight of an alpha, beta-monoethylenically unsaturated acid and 0–30 percent by weight of an hydroxyalkyl ester of an alpha, beta-monoethylenically unsaturated acid. These monomers are polymerized in the presence of an alkyd resin containing a polymerizable unsaturated group, epoxy esters containing a polymerizable group, drying oils, fatty acids of drying oils and diene polymers. The resulting polymers are water solubilized by the addition of ammonia or an amine. The water dispersible polymer contains hydroxy and/or carboxyl functional groups and contains an alpha, beta-monoethylenically unsaturated acid monomer and/or a hydroxy alkyl ester of such a monomer and other ethylenically unsaturated monomers. The compositions disclosed in U.S. Pat. No. 4,179,417 are employed as water based paints and can optionally contain a cross linking agent.

Canadian Patent No. 814,528, issued June 3, 1969, discloses low molecular weight alkali soluble resin, resin cuts and methods of their preparation and purification. The resins are disclosed as being especially useful as emulsifiers, leveling agents and film-formers. The number average molecular weight of the resins range from 700–5,000 and the resins have acid numbers between 140–300. The resins are disclosed as emulsifiers in the preparation of emulsion polymers resulting in emulsion polymers which are stable and substantially free from coagulum. For this use, i.e. emulsifier in emulsion polymerization reactions, the resins must have a number average molecular weight between 1,000 and 2,000 and preferably between 1,000 and 1,500. Resins having a number average molecular weight greater than 2,000 result in unstable and coagulated emulsion polymers when used as the emulsifier in emulsion polymerization reactions.

Problems commonly associated with high molecular weight emulsion polymers include problems relating to mechanical stability, freeze-thaw stability, viscosity, pigment dispersity and wetting. In particular, the viscosity of high molecular weight emulsion polymers is shear dependent (non-Newtonian) and shear thinning (decrease in viscosity) occurs.

The resin-fortified emulsion polymers of the present invention provide extraordinary mechanical, physical and performance properties when compared to conventional emulsion polymers and represent a pioneering advance in emulsion polymerization technology. In particular, the resin-fortified emulsion polymers of the present invention possess (1) substantially Newtonian-like rheological properties (viscosity is shear independent), (2) excellent mechanical stability and freeze-thaw stability, (3) excellent pigment dispersity and (4) excellent wetting properties. Additionally, the present invention allows great flexibility in controlling the amount and type of resin added to the emulsion polymer compared to the Blank et al. emulsion polymers and the polymers disclosed in Canadian No. 814,528. The greater flexibility allows for the control of the properties of the final emulsion polymer product.

SUMMARY OF INVENTION

Briefly, in accordance with the present invention, a resin-fortified emulsion polymer is prepared by adding a resin to an emulsion polymerization reaction mixture during the polymerization reaction. The resin is a low molecular weight polymer and is soluble or dispersible in water or alkali solutions. The emulsion polymerization reaction mixture contains any monomers employed in emulsion polymerization reactions. The resin is added to the reaction mixture during the emulsion polymerization i.e., after initiation of emulsion polymerization reaction but before the polymerization reaction is substantially completed. The resulting resin-fortified emulsion polymers possess substantially Newtonian rheological properties, improved stability and good pigment dispersity and wetting properties.

The resins are added to the emulsion polymerization reaction mixture as solutions, solids (such as flakes or granules), or as slurries (suspension of solids in water). When the resin is added as a solid, either as a flake, granular or slurry, then an alkaline material is added to the reaction mixture in quantities sufficient to solubilize the resin. The monomer component of the emulsion polymerization reaction can be introduced into the reaction mixture all at once or portions of the monomer component can be added to the reaction mixture at various times, i.e., multistage monomer addition. In either case, the monomers are usually added to the reaction mixture slowly over a ½ hour to 2 hour period.

DETAILED DESCRIPTION OF THE INVENTION

When used herein the term "emulsion polymer" refers to any polymer prepared by emulsion polymerization. Such polymers are formed by the polymerization of one or more monomers capable of undergoing free radical emulsion polymerization. When used herein the term "resin" encompasses all low molecular weight resins of from about 500 to about 20,000, and preferably about 500 to 10,000, number average molecular weight which are soluble or dispersible in water or alkali.

In practicing the present invention, a emulsion polymerization is conducted wherein a low molecular weight resin is added to an emulsion polymerization reaction mixture during the emulsion polymerization reaction. The resin is added to the emulsion polymerization reaction mixture after polymerization has been initiated but before the emulsion polymerization reaction is substantially complete. The resin can be added as a solid, a solution or slurry. The monomers employed in the emulsion polymerization reaction can be added to the reaction mixture in a single stage or, alternatively, can be added to the reaction mixture in a multi-stage addition.

In conducting the present emulsion polymerization reaction standard emulsion polymerization techniques are employed with the exception of the in situ resin addition. Standard nonionic and anionic surfactants are employed in the reaction. Advantageously, the reaction is conducted at an elevated temperature of from about 60° to about 100° C., at ambient pressure and under an inert atmosphere such as nitrogen. The reaction mixture is maintained under agitation employing standard mixing techniques.

Before the resin is added to the emulsion polymerization reaction mixture there must be a polymeric (or steric) stabilizer present in the reaction mixture to prevent coagulation of the emulsion particles. The stabilizer can be any of the conventional nonionic surfactants such as ethoxylated alkylphenols including ethoxylated nonylphenol having at least 20 ethylene oxide units, ethoxylated octylphenol having at least 20 ethylene oxide units or, alternatively, functional monomers such as acrylic acid, methacrylic acid or polyethylene glycol monomethacrylate. The stabilizer is added to the reaction mixture prior to resin addition and usually in amounts of from about 1 to about 8 percent by weight of the reaction mixture and preferably from about 2 to about 4 weight percent.

The resins are added to the emulsion polymerization reaction mixture as solutions, solids (flakes or granulars) or as slurries. When the resin is added as a solid then a sufficient amount of alkaline material must be added to the reaction mixture in order to solubilize the resin. The method of addition of the resin to the reaction mixture is not critical to the practice of the present invention and may be introduced into the reaction mixture all at once or in portions over time during the emulsion polymerization reaction.

The monomers employed in the emulsion polymerization are preferably added to the reaction mixture in two or more stages. Typically, a small amount of monomer mix is added to the water/surfactant mixture with agitation. Thereafter the initiator is added to the reaction mixture followed by the addition of another portion of the monomer mix and the steric stabilizer. The polymerization reaction is then allowed to start. After the polymerization reaction has started, the low molecular weight resin is then added to the reaction mixture. After the addition of the resin, the balance of the monomer mix is added to the reactor and the emulsion polymerization reaction is allowed to be completed.

Suitable low molecular weight support resins employed in the practice of the present invention include any solution or bulk polymerized polymers prepared from ethylenically unsaturated monomers such as olefins, mono vinylidene aromatics, alpha, beta-ethylenically unsaturated carboxycylic acids and esters thereof and ethylenically unsaturated dicarboxylic anhydrides. They are known materials and are prepared employing standard solution polymerization techniques. Preferably, the support resins are prepared in accordance with the teachings of U.S. Pat. No. 4,414,370, U.S. Pat. No. 4,529,787 and U.S. Pat. No. 4,546,160 all of which are incorporated herein by reference.

Other suitable commercially available resins include water dispersed or water dispersable aliphatic polyurethanes such as Spensol L52 an aliphatic polyurethane commercially available from Spenser Kellogg, and water dispersable silicone ethylene oxide copolymers such as FF400, a water dispersable silicone-ethylene oxide copolymer commercially available from Dow Corning. These and other similar resins can be used especially where the desirable characteristics of the resin, i.e., flexibility, slip properties, durability, etc., are required. These resins should be low molecular weight with a number average molecular weight of from about 500 to 20,000.

Suitable monomers employed in the preparation of the support resins include acrylic acid, methacrylic acid, styrene, alpha-methylstyrene, hydroxyethylmethacrylate and esters of acrylic acid and methacrylic acid.

Preferred support resins include those resins containing Styrene (ST), alpha methylstyrene (AMS), acrylic acid (AA) and mixtures thereof. An especially preferred support resin is a ST/AA copolymer containing three parts ST and one part AA and which has a number average molecular weight of from about 1,000 to about 6,000 and, preferably, from about 2,000 to about 4,000.

The monomers employed in the preparation of the present emulsion polymers are any monomers used in emulsion polymerization reactions. Suitable monomers include ethylenically unsaturated monomers such as olefins, mono vinylidene aromatics, alpha, beta-ethylenically unsaturated carboxylic acids and esters thereof, ethylenically unsaturated dicarboxylic anhydrides and halo substituted olefinics. Suitable monomers include styrene (ST), alphamethylstyrene (AMS), acrylic acid (AA), methacrylic acid (MAA), methylmethacrylate (MMA), butylmethacrylate (BMA), butylacrylate (BA), 2-ethylhexylacrylate (2-EHA), ethylacrylate (EA), hydroxyethylacrylate (HEA) and hydroxyethylmethacrylate (HEMA).

As noted above, the resins useful in the process of the present invention should be low molecular weight with a number average molecular weight in the range of from about 500 to about 20,000, preferably about 500 to about 10,000 and optimally about 2,000 to about 4,000. Also the resins must be water soluble or water dispersable either as is or in an alkaline medium such as ammonium hydroxide.

In one embodiment of the present invention, water and a sufficient amount of surfactant are added to a reactor under an inert atmosphere and brought to reaction temperature. The monomer mixture and the initiator are then co-fed into the reactor with agitation. The monomer mixture may be added all at once or, alternatively, it can be fed into the reactor over an extended period of time, i.e., 1–2 hours. After the initiator addition, a low molecular weight resin is then added to the reaction mixture during the polymerization process. The resin can be added to the reaction mixture as a solid or a solution. When the resin is added as a solid, an alkali (aqueous $NH_4OH$) is added to the reaction mixture with the solid resin or after the addition of the solid resin. The time at which the support resin is added to the reaction mixture is not critical to the practice of the present invention, however, it is preferred that the reaction of the monomers be at least about 30%, preferably about 30 to 50%, complete before the resin is added to the reaction mixture. The support resin can be added immediately after the addition of the initiator and anytime up to an hour after the monomer mixture and initiator have been added to the reaction mixture.

In another embodiment of the present invention, water and sufficient amount of surfactant are added to a reactor under an inert atmosphere and brought to reaction temperature. A minor portion (0.1–15% by weight) of the monomer mixture to be used in the emulsion polymerization reaction is added to the reactor followed by the addition of an initiator. A second portion (25–90 weight percent) of the monomer mixture is then added slowly over a 1 to 2 hour period to the reaction mixture. After the addition of this second portion of monomer, the support resin is added to the reaction mixture as either a solid or a solution. After the addition of the resin, a third portion (5–75 percent by weight) of the monomer mixture is added slowly to the reaction mixture over a $\frac{1}{4}$ to 1 hour period. If the support resin is added as a solid then aqueous alkali is simultaneously added to the reactor during the addition of the third portion of monomer mixture. The reaction is then held at reaction temperature with agitation for an additional 1 to 2 hour period.

In another embodiment of the present invention, water and a sufficient amount of surfactant are added to a reactor under an inert atmosphere and brought to the reaction temperature. A minor portion (1/50–1/10) of the monomer mixture is added to the reactor followed by the addition of an initiator. The reaction is held for 5 minutes and then the balance of the monomer mixture is slowly added to the reactor over a 1 to 2 hour period. A support resin is then added to the reaction mixture anytime up to an hour after all of the monomer mixture has been added to the reactor. If the support resin is added as a solid, then a sufficient amount of alkali must be added to the reaction mixture to solubilize the solid resin. The reaction mixture is then held for an additional one to two hours at elevated temperature.

For those embodiments where the resin and alkali are added with some of the monomers, the precharge should contain all of the monomers, i.e., acid containing monomers such as acrylic acid which will be solubilized by the alkali. If this is not done, the acid functional monomer may go into the aqueous phase and will not be available for reaction with the monomers which are not water soluble.

The support resin is added to the present emulsion polymerization reaction in amounts sufficient to modify the flow characteristics of the resulting emulsion polymer. Amounts ranging from about 2 to about 50 weight percent or more based on the total weight of solids in the emulsion polymerization reaction mixture are usually effective. Advantageously the support resin is added in amounts greater than about 5% and preferably greater than about 10% by total weight of solids in the emulsion reaction mixture. The optimum amount of support resin to be added during the emulsion polymerization reaction will depend on a variety of factors, such as, the particular makeup of the support resin, the particular makeup of the emulsion polymer, the end use application for the emulsion polymer, and the environment in which the emulsion polymer will be used in. One skilled in the art can readily determine the optimum amount of support resin to be used in a particular application by conducting routine experiments.

The following examples illustrate the practice of the present invention but should not be construed as limiting its scope.

EXAMPLE 1

Support Resin Preparation

The following support resins were prepared employing the bulk polymerization process described in U.S. Pat. No. 4,529,787. The monomer content, number average (Mn) and the weight average molecular weight are listed below:

|  | Monomers* | Monomer Ratio | Mn** | Mw |
| --- | --- | --- | --- | --- |
| Resin A | ST/AMS/AA | 62ST/21AMS/17AA | 1740 | 3605 |
| Resin B | ST/AA | 75ST/25AA | 3270 | 8360 |
| Resin C | ST/AMS/AA | 31ST/37AMS/32AA | 3040 | 8430 |
| Resin D | ST/AMS/AA | 42ST/21AMS/37AA | 2060 | 4880 |

*ST = styrene, AMS = alphamethylstyrene, AA = acrylic acid
Mn**Molecular weight was determined by gel permeation chromatography (GPC) using polystyrene as the standard.

EXAMPLE 2

Resin-Fortified Emulsion Polymers 1–5

The Items A (water, surfactant), B (water, initiator), C (monomer mixture), D (resins from Example 1), E (monomer mixture) and F (aqueous $NH_4OH$) listed in Table 1 below were prepared by admixing the components of each item. Items A, B, C and E were purged with $N_2$ for over six (6) minutes. The resin-fortified emulsion polymers 1–5 were prepared by adding Item A to a reactor, and heating to a temperature of 80° C. under a low stream of $N_2$. Ten (10) grams (g) of Item C were added to the reactor and stirred for one (1) minute. Item B (initiator) was added to the reactor with stirring. Four (4) minutes after the addition of Item B, the balance of Item C was added to the reactor over 40–60 minutes. Item D (resin) was added to the reactor with stirring. One minute after the addition of Item D, Items E and F were simultaneously added to the reactor with stirring. Item E was added over a 40–60 minute period while Item F was added over a 20–30 minute period.

After Item E was added to the reactor, the reaction was maintained for an additional 40 minute period. The reaction mixture was cooled to room temperature and filtered through cheese cloth.

TABLE 1

| Resin-Fortified Emulsion Polymer | A | | | B | | C | | | | | | | |
|---|---|---|---|---|---|---|---|---|---|---|---|---|---|
| | H$_2$O | TX100 | NaLS | H$_2$O | *APS | ST | MMA | 2EHA | BMA | BA | MAA | AA | TX100 |
| 1 | 331 | 0.56 | 2.80 | 36.8 | 1.12 | 84 | 65.1 | 58.9 | — | — | 10.6 | — | — |
| 2 | 380 | 0.50 | 3.0 | 30 | 1.2 | — | — | — | 230 | — | 8 | — | — |
| 3 | 380 | 0.50 | 3.0 | 30 | 1.2 | — | — | — | 230 | — | 8 | — | — |
| 4 | 380 | 0.56 | 3.5 | 30 | 1.2 | — | 196 | — | — | 49 | 4 | — | — |
| 5 | 270 | — | 3.0 | 20 | 1.4 | 32 | 64 | — | — | 64 | 1.6 | 1.2 | 3.0 |

| Resin-Fortified Emulsion Polymer | D | | E | | | | | F | |
|---|---|---|---|---|---|---|---|---|---|
| | RESIN B | RESIN A | ST | MMA | 2EHA | BMA | BA | H$_2$O | NH$_4$OH |
| 1 | 64 | — | 36.8 | 28.5 | 25.7 | — | — | 34.0 | 16.8 |
| 2 | 35 | — | — | — | — | 120 | — | 20 | 12 |
| 3 | 8.75 | — | — | — | — | 120 | — | 20 | 6.8 |
| 4 | 17 | — | — | 80 | — | — | 20 | 20 | 8 |
| 5 | 96 | 25.6 | 160 | — | — | — | — | 110 | 16 |

*APS = Ammonium persulfate
TX100 = TRITON X-100
NaLS = sodium lauryl sulfate
ST = Styrene
MMA = methyl methacrylate
2EHA = 2 ethylhexylacrylate
BA = butyl acrylate
MAA = methacrylic acid
AA = acrylic acid

TABLE 2

| Resin-Fortified Emulsion Polymer | A | | B | | C | | | D | | |
|---|---|---|---|---|---|---|---|---|---|---|
| | H$_2$O | DS10 | H$_2$O | APS | MMA | ST | 2EHA | H$_2$O | NaSS | TX100 |
| 6 | 350 | 3.5 | 30 | 1.3 | 50.2 | 64.6 | 45.2 | 35 | 0.6 | 1.0 |
| 7 | 350 | 3.5 | 30 | 1.3 | 50.2 | 64.6 | 45.2 | 35 | 0.6 | 1.0 |

| Resin-Fortified Emulsion Polymer | E | | | | F | | G | |
|---|---|---|---|---|---|---|---|---|
| | MMA | ST | 2EHA | HEM10 | Resin B | Resin A | H$_2$O | NH$_4$OH |
| 6 | 62.8 | 80.8 | 56.5 | 8 | 37.4 | — | 30 | 13 |
| 7 | 62.8 | 80.8 | 56.5 | 8 | — | 37.4 | 30 | 13 |

*DS10 = sodium nonylphenyl sulfonate
NaSS = sodium styryl sulfonate
HEM10 = polyethylene glycol monomethacrylate (10 moles PEG) ALCOLAC

EXAMPLE 3

Resin-Fortified Emulsion Polymers 6 & 7

The Items A (water, surfactant), B (water, initiator), C (monomer), D (water, surfactant), E (monomer), F (resins from Example 1) and G (aqueous NH$_4$OH) listed in TABLE 2 below were prepared by admixing the components of each item. Items A, B, C and E were purged with N$_2$ for six (6) minutes. The resin-fortified emulsion polymers 6 and 7 were prepared by adding Item A into a reactor and heating to a temperature of 80° C. under a slow stream of N$_2$. Ten (10) g of Item C were added to the reactor and stirred for one minute. Item B was added to the reactor. Five (5) minutes after the addition of Item B, Item D and 20 g of Item C were simultaneously added to the reactor over a 7–10 minute period. Item E was then added to the reactor over a 50–60 minute period. Then Item F (the resin) was added to the reactor followed one minute later with the addition of Items C and G. Item C was added over a 30–50 minute period while Item G was added over a 20–30 minute period. After all of Item C was added to the reactor, the reaction mixture was maintained at 80° C. with stirring for an additional 40 minutes. The reaction mixture was cooled to room temperature and filtered through cheese cloth.

EXAMPLE 4

Resin-Fortified Emulsion Polymers 8-11

The Items A (water, surfactant), B (water, initiator), C (monomers), D (water, surfactant), E (monomers) and F (resin solution) listed in TABLE 3 below were prepared by admixing the components of each item. The resin solution was the resin listed plus deionized water and sufficient ammonium hydroxide to bring the pH to about 9 to solubilize the resin. Items A, B, C, D and E were purged with N$_2$ for over 6 minutes. The resin-fortified emulsion polymers 8-11 were prepared by adding Item A to a reactor and heating to 80° C. under a slow stream of N$_2$. Ten (10) g of Item C were added to the reactor with stirring and after one minute Item B were added to the reactor. Five (5) minutes after the addition of Item B, Item D and 20 g of Item C were simultaneously added to the reactor over a 7–10 minute period. Item E was then added to the reactor over a 50–60 minute period. After the addition of Item E, Items C and F were simultaneously added to the reactor. Item C was added to the reactor over a 30–50 minute period while Item F was added to the reactor over a 20–30 minute period. After all of Item C was added to the reactor, the reaction mixture was maintained at 80° C. with stirring for an additional 40 minutes. The reaction mixture was cooled to room temperature and filtered through cheese cloth.

TABLE 3

| Resin-fortified Emulsion Polymer | A | | | B | | C | | | D | |
|---|---|---|---|---|---|---|---|---|---|---|
| | H₂O | TX100 | DX10 | H₂O | APS | MMA | ST | 2EHA | H₂O | NaSS |
| 8 | 310 | 0.5 | 2.5 | 40 | 1.3 | 50.2 | 64.6 | 45.2 | 40 | 0.6 |
| 9 | 310 | 0.5 | 2.5 | 40 | 1.3 | 50.2 | 64.6 | 45.2 | 40 | 0.6 |
| 10 | 310 | 0.5 | 2.5 | 40 | 1.3 | 50.2 | 64.6 | 45.2 | 40 | 0.6 |
| 11 | 310 | 0.5 | 30 | 30 | 1.3 | 50.2 | 64.6 | 45.2 | 40 | 0.6 |

| Resin-fortified Emulsion Polymer | E | | | | | F | |
|---|---|---|---|---|---|---|---|
| | MMA | ST | 2EHA | HEM10 | HEM5 | Resin | Ammonium Solutions |
| 8 | 62.8 | 80.8 | 56.5 | 6 | — | 80 | (Resin A; 11.3% solid) |
| 9 | 62.8 | 80.8 | 56.5 | 6 | — | 80 | (Resin C; 11.3% solid) |
| 10 | 62.8 | 80.8 | 56.5 | 6 | — | 80 | (Resin D; 11.3% solid) |
| 11 | 62.8 | 80.8 | 56.5 | — | 12 | 100 | (Resin B; 30% solid) |

EXAMPLE 5

Resin-Fortified Emulsion Polymers 12–15

The Items A (water, surfactant), B (water, initiator), C (monomers), D (monomers), E (resin solution, NH₄OH) and F (styrene) listed in TABLE 4 below, were prepared by admixing the components of each item. Items A, B, C, D and F were purged with N₂ for over 6 minutes. Resin-fortified emulsion polymers 12–15 were prepared by adding Item A to a reactor and heating to a temperature of 80° C. under a slow stream of N₂. Ten (10) g of Item C were added to the reactor with stirring and then one minute later Item B was added. Four minutes after the addition of Item B, the rest of Item C was added to the reactor over a 15–20 minute period. Item D was then added to the reactor over a 30–35 minute period. Five minutes after the addition of Item D, Items E and F were simultaneously added to the reactor. Item E was added to the reactor over a 30–35 minute period while Item F was added over a 40–50 minute period. The reaction mixture was maintained at 80° C. with stirring for 40 minutes after all of Item F had been added to the reactor. The reaction mixture was then cooled to room temperature and filtered through cheese cloth.

EXAMPLE 6

Resin-Fortified Emulsion Polymer 16–20

The Items A (water, surfactant), B (water, initiator), C (monomers with stabilizer), D (resin), E (monomers) and F (aqueous NH₄OH) listed in TABLE 5 below were prepared by admixing the components of each item. Items A, B, C and E were purged with N₂ for 6 minutes. The resin-fortified emulsion polymers 16–20 were prepared by adding Item A to a reactor and heating to a temperature between 75° C. and 80° C. under a slow stream of N₂. One-twentieth (1/20) of Item C was added to the reactor, with stirring, followed by the addition of Item B to initiate the polymerization reaction. Five (5) minutes after the addition of Item B, the balance of Item C was added to the reactor over a ½ hour period. Items D, E and F, when F was employed, were added to the reactor in three different procedures as follows:

Procedure 1

For resin-fortified emulsions 16 and 18, Item D was added to the reactor as solid flakes. Items E and F were simultaneously added to the reactor over a ½ hour period. The reaction was then allowed to continue for one hour at 75°–80° C. with stirring.

Procedure 2

For resin-fortified emulsions 17 and 19, Items E and D were simultaneously added to the reactor over a ½ hour period. The reaction was then allowed to continue for one hour at 75°–80° C. with stirring.

TABLE 4

| Resin-Fortified Emulsion Polymers | A | | B | | C | | D | | |
|---|---|---|---|---|---|---|---|---|---|
| | H₂O | NaLS | H₂O | APS | MONOMERS* | MAA | MONOMERS* | MAA | HEM5 |
| 12 | 260 | 30 | 16 | 1.4 | 60 | 1.8 | 100 | 11 | 5 |
| 13 | 260 | 30 | 16 | 1.4 | 60 | 1.8 | 100 | 11 | 5 |
| 14 | 260 | 30 | 16 | 1.4 | 60 | 1.8 | 100 | 11 | 5 |
| 15 | 260 | 30 | 16 | 1.4 | 60 | 1.8 | 100 | 11 | 5 |

| Resin-Fortified Emulsion Polymers | E | | | F |
|---|---|---|---|---|
| | RESIN | SOLUTION | NH₄OH | ST |
| 12 | 156 | (Resin C; 20.5%) | 5 | 160 |
| 13 | 156 | (Resin B; 20.5%) | 5 | 160 |
| 14 | 156 | (Resin D; 20.5%) | 5 | 160 |
| 15 | 156 | (Resin A; 13.5%) | 5 | 160 |

*Monomers = MMA/St/BA/EA/TX100 = 20/50/20/10/1.8 (Wt. %)

Procedure 3

For resin-fortified emulsion 20, Item D (flakes) was added to the reactor 40 minutes after the addition of all of Item C. Item F was then added to the reactor over a ½ hour period. The reaction was allowed to continue for one hour at 60° C. with stirring.

TABLE 5

| Resin-Fortified | A | | | | | B | | C | | | | |
|---|---|---|---|---|---|---|---|---|---|---|---|---|
| Emulsion Polymer | H₂O | TX100 | NaLS | DS10 | NaSS | H₂O | APS | MONOMERS | MAA | HEM10 | HEM20 | TX100 |
| 16 | 41.4 | 0.07 | 0.35 | — | — | 4.61 | 0.140 | 26.0 | 1.33 | — | — | — |
| 17 | 42.45 | 0.07 | 0.438 | — | — | 3.753 | 0.150 | 27.53 | 0.751 | — | — | 0.375 |
| 18 | 40.29 | 0.06 | — | 0.476 | 0.077 | 3.574 | 0.154 | 27.4 | — | 0.714 | — | — |
| 19 | 37.62 | 0.057 | — | 0.342 | 0.068 | 3.42 | 0.148 | 21.65 | — | 0.912 | — | — |
| 20 | 46.55 | 0.059 | — | 0.591 | 0.0829 | 3.555 | 0.213 | 33.79 | — | — | 0.711 | — |

ITEMS (Components* in grams)

| Resin-Fortified Emulsion Polymer | D RESIN (from Example 1) | E MONOMERS | F H₂O | F NH₄OH (28%) |
|---|---|---|---|---|
| 16 | B 8.0 (flake) | 11.4 | 4.26 | 2.11 |
| 17 | A 9.41 (23% sol.) | 15.01 | — | — |
| 18 | D 2.40 (flake) | 23.83 | — | 0.83 |
| 19 | A 21.0 (17% sol.) | 19.38 | — | — |
| 20 | C 12.0 (flake) | 3.55 | — | 3.7 |

*DS10 = Siponate DS 10
NaSS = Spinomer Na SS
Monomers = Polymer of ST/MMA/BA/BMA/2EHA/EA
HEM10 = Polyethylene glycol monomethacrylate (20 moles PEG)

EXAMPLE 7

A resin cut having the following formulation was prepared:

| Resin Cut A | Parts by Weight |
|---|---|
| Deionized water | 74.516 |
| Ethoxylated octylphenol (40 moles ethylene oxide) Triton X-405 (70% solids) | 1.652 |
| Ammonium Hydroxide | 3.188 |
| Resin A Flakes (Example 1) | 16.515 |
| Resin B Flakes (Example 1) | 4.129 |
| | 100.000 |

Resin Cut A was prepared by charging the water, Triton X-405 and ammonium hydroxide into a vessel at ambient temperature. The Resin A & B Flakes were sifted in with moderate agitation. The temperature was raised to 70° C. and increased agitation when the mixture reaches 70° C. Hold with agitation for about 30 minutes at 70° C. Cool to less than 37° C. and filter. Store in a sealed contained to prevent ammonia loss.

An emulsion polymer having the following components was prepared:

| | Parts by Weight |
|---|---|
| Initial Flask Charge: | |
| Deionized Water | 22.978 |
| Sodium Lauryl Sulfate (15% Actives) | 2.182 |
| Ethoxylated Octylphenol (10 moles ethylene oxide) (Triton X-100) | 0.245 |
| | 25.405 |
| Ammonium Persulfate Charge: | |
| Deionized Water | 1.608 |
| Ammonium Persulfate | 0.225 |
| | 1.823 |
| First Stage Monomer Charge: | |
| Styrene | 5.402 |
| Methylmethacrylate | 1.688 |
| Butylacrylate | 1.351 |
| Methacrylic Acid | 0.717 |
| | 9.158 |
| Resin Cut A (21.8% Solids) | 29.727 |
| Second Stage Monomer Charge: | |
| Styrene | 20.322 |
| Methylmethacrylate | 6.351 |
| Butylacrylate | 5.081 |
| | 31.754 |
| Post Hold Ammonia Charge: | |
| Deionized water | 1.608 |
| Ammonium Hydroxide | 0.505 |
| | 2.113 |
| Preservative (Kathon LX-14) | 0.010 |
| | 100.000 |

The Initial Flask Charge was heated to 79° C. with mild agitation and a mild nitrogen purge. About 10% of the First Stage Monomer Charge was added followed immediately by the Ammonium Persulfate Charge. This was held for about 20 minutes to build a radical flux. The remaining First Stage Monomer Charge was added incrementally over about 30 minutes followed by a 10 minute hold. Resin Cut A was then added incrementally over about 30 minutes and was followed immediately by the addition of the Second Stage Monomer Charge incrementally over about 80 minutes. Agitation was increased 25–50% during the last 25 minutes of the Second Stage Monomer Charge addition. After all monomers were added the mixture was held for about 60 minutes. At this point, the Post Hold Ammonia Charge was added and the mixture was cooled to 37° C. The pH should be in the range of 9.3 to 9.6. The preservative was then added and the product was filled into suitable containers.

EXAMPLE 8

The following emulsion polymer was prepared:

| | |
|---|---|
| A: | |
| Deionized Water | 90 g |
| Sodium Lauryl Sulfate | 1.2 g |
| B: | |
| Deionized Water | 20 g |
| Ammonium Persulfate | 0.8 g |
| C: | |
| Methymethacrylate | 23.5 g |
| Styrene | 30.3 g |
| 2-Ethylhexylacrylate | 21.2 g |
| Ethoxylated Octylphenol (10 moles ethylene oxide) (Triton X-100-100% solids) | 2.25 g |
| Methacrylic Acid | 4.5 g |

-continued

| | |
|---|---|
| D: | |
| Deionized Water | 20 g |
| Ammonium Hydroxide (28%) | 6 g |
| E: | |
| Methylmethacrylate | 23.5 g |
| Styrene | 30.3 g |
| 2-Ethylhexylacrylate | 21.2 g |
| F: | |
| Resin B Aqueous Ammonia Cut (18.29% solids) (pH = 9) | 85 g |

Each of Items A through F were prepared by mixing the components and purging with nitrogen for 6 minutes. Solution F includes sufficient Resin B, deionized water and ammonium hydroxide to produce an 18.29% solution (of Resin B) at a pH of 9. Item A was added to the reaction and heated to 80° C. under a slow stream of nitrogen. 10 g of Item C were added to the reactor and stirred for 1 minute. Then Item B was added and the reaction was held for 10 minutes. The rest of Item C was added over 25 to 30 minutes. This was followed by addition of Item D over 5 minutes and held for 5 minutes. Items E & F were added simultaneously over a period of 40-50 minutes for Item E and 25-35 minutes for Item F. After Item E was added, the reaction was held for one hour at 80° C. and then cooled to room temperature and filtered.

Similar resin-fortified emulsion polymers are prepared when various monomers are employed in an emulsion polymerization reaction when various support resins, described herein, are added to the emulsion polymerization reaction mixture during the polymerization reaction. The resulting resin-fortified emulsion polymers possess substantially Newtonian-like rheological characteristics. These resin fortified polymers are also stable and have good pigment dispersity and wetting characteristics.

The resin-fortified emulsion polymers of the present invention are useful in any of the standard applications for emulsion polymers. Typical use applications for the present resin-fortified emulsion polymers includes coatings, and graphic arts.

Of particular interest in the practice of the present invention the resin fortified emulsion polymer described in Example 7 is employed as a formaldehyde-free coating for wood. The emulsion polymer is applied to the wood substrate employing standard application techniques.

I claim:

1. A resin-fortified polymer emulsion having Newtonian-like flow characteristics, the resin-fortified polymer emulsion being made by a method which comprises the following steps:
   (a) emulsion-polymerizing a monomer charge comprising at least one emulsion-polymerizable monomer in the presence of a polymeric stabilizer and an initiator under emulsion-polymerization reaction conditions effective for initiating emulsion polymerization of an emulsion-polymerization mixture, the polymeric stabilizer being present in an amount that is effective for preventing coagulation of emulsion polymer particles which are forming in the emulsion-polymerization mixture; and thereafter
   (b) adding to the emulsion-polymerization mixture, while emulsion polymerization of the emulsion-polymerizable monomer is occurring, an effective amount of at least one support resin for controllably affecting the physical characteristics of the emulsion polymer product, said resin being selected from the group consisting of water soluble resins, water dispersible resins, alkali soluble resins, alkali dispersible resins and mixtures thereof, said resin having been produced either by a solution-polymerization method or by a bulk-polymerization method, wherein the resin is produced from at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydrides, and mixtures thereof,
thereby producing the resin-fortified polymer emulsion having Newtonian-like flow characteristics.

2. A coating composition comprising the resin-fortified polymer emulsion of claim 1.

* * * * *

UNITED STATES PATENT AND TRADEMARK OFFICE
CERTIFICATE OF CORRECTION

PATENT NO.  : 4,954,558

DATED       : September 4, 1990

INVENTOR(S) : Sheng-Liang Tsaur

It is certified that error appears in the above-identified patent and that said Letters Patent is hereby corrected as shown below:

Col. 1, line 26, immediately following the word "instability" please delete the period [.] and insert a comma [,] in place thereof.

Col. 3, line 24, immediately preceding the word "emulsion" please delete the word "a" and substitute the word -- an -- in place thereof.

Col. 4, line 22, please delete "carboxycylic" and insert the term -- carboxylic -- in place thereof.

Col. 4, line 49, please delete "Styrene" and insert -- styrene -- in place thereof.

Col. 6, line 22, immediately following the word "used" please delete the word "in".

Col. 6, line 59, please delete the word "low" and insert the word -- slow -- in place thereof.

Signed and Sealed this

Nineteenth Day of May, 1992

Attest:

DOUGLAS B. COMER

*Attesting Officer*     Acting Commissioner of Patents and Trademarks